US012759943B2

(12) United States Patent
Marley

(10) Patent No.: US 12,759,943 B2
(45) Date of Patent: Oct. 13, 2026

(54) LTCC DIELECTRIC COMPOSITIONS AND DEVICES HAVING HIGH Q FACTORS

(71) Applicant: Vibrantz Corporation, Mayfield Heights, OH (US)

(72) Inventor: Peter Marley, Farmington, NY (US)

(73) Assignee: Vibrantz Corporation, Mayfield Heights, OH (US)

( * ) Notice: Subject to any disclaimer, the term of this patent is extended or adjusted under 35 U.S.C. 154(b) by 1188 days.

(21) Appl. No.: 17/433,410

(22) PCT Filed: Feb. 26, 2020

(86) PCT No.: PCT/US2020/019832
§ 371 (c)(1),
(2) Date: Aug. 24, 2021

(87) PCT Pub. No.: WO2020/176584
PCT Pub. Date: Sep. 3, 2020

(65) Prior Publication Data

US 2022/0135484 A1 May 5, 2022

Related U.S. Application Data

(60) Provisional application No. 62/811,079, filed on Feb. 27, 2019.

(51) Int. Cl.

| | |
|---|---|
| ***C04B 35/46*** | (2006.01) |
| ***C03C 4/14*** | (2006.01) |
| ***C03C 8/18*** | (2006.01) |
| ***C04B 35/14*** | (2006.01) |
| ***H01G 4/12*** | (2006.01) |

(52) U.S. Cl.
CPC ................ *C04B 35/46* (2013.01); *C03C 8/18* (2013.01); *C04B 35/14* (2013.01); *C04B 2235/3203* (2013.01); *C04B 2235/3213* (2013.01); *C04B 2235/3232* (2013.01); *C04B 2235/3267* (2013.01); *C04B 2235/3279* (2013.01); *C04B 2235/3281* (2013.01); *C04B 2235/3284* (2013.01); *C04B 2235/3409* (2013.01); *C04B 2235/3418* (2013.01); *C04B 2235/442* (2013.01); *C04B 2235/445* (2013.01); *C04B 2235/5436* (2013.01); *C04B 2235/5445* (2013.01); *C04B 2235/604* (2013.01); *C04B 2235/656* (2013.01)

(58) Field of Classification Search
CPC . C04B 35/46; C04B 35/14; C04B 2235/3213; C04B 2235/3281; C03C 8/18
See application file for complete search history.

(56) References Cited

U.S. PATENT DOCUMENTS

| | | | |
|---|---|---|---|
| 2,726,161 A | 12/1955 | Beck et al. | |
| 3,004,197 A | 10/1961 | Rodriguez et al. | |
| 3,189,978 A | 6/1965 | Stetson | |
| 4,379,319 A | 4/1983 | Wilson | |
| 4,425,263 A | 1/1984 | Nazarenko | |
| 4,540,676 A | 9/1985 | Chu et al. | |
| 4,816,430 A | 3/1989 | Chu | |
| 4,882,305 A | 11/1989 | Chu et al. | |
| 4,892,847 A | 1/1990 | Reinherz | |
| 5,245,433 A | 9/1993 | Sid-Ahmed et al. | |
| 5,258,335 A | 11/1993 | Muralidhar et al. | |
| 5,271,797 A | 12/1993 | Kamisawa | |
| 5,296,426 A | 3/1994 | Bum | |
| 5,571,767 A | 11/1996 | Wilson et al. | |
| 5,599,757 A | 2/1997 | Wilson et al. | |
| 5,601,673 A | 2/1997 | Alexander | |
| 5,657,532 A | 8/1997 | Alexander et al. | |
| 5,661,882 A | 9/1997 | Alexander | |
| 5,714,246 A | 2/1998 | Shaikh et al. | |
| 5,790,367 A | 8/1998 | Mateika et al. | |
| 5,818,686 A | 10/1998 | Mizuno et al. | |
| 5,828,266 A | 10/1998 | Couet | |
| 5,841,625 A | 11/1998 | Hennings et al. | |
| 5,994,253 A | 11/1999 | Sasaki et al. | |
| 5,995,360 A | 11/1999 | Hata et al. | |
| 5,998,037 A | 12/1999 | Sridharan et al. | |
| 6,043,174 A | 3/2000 | Maher et al. | |
| 6,078,494 A | 6/2000 | Hansen | |
| 6,185,087 B1 | 2/2001 | Park et al. | |
| 6,284,216 B1 | 9/2001 | Sakai et al. | |
| 6,309,995 B1 | 10/2001 | Maher et al. | |
| 6,346,493 B1 * | 2/2002 | Kniajer | C03C 8/14 501/78 |

(Continued)

FOREIGN PATENT DOCUMENTS

| | | |
|---|---|---|
| CN | 101948249 A | 1/2011 |
| EP | 1890303 A1 | 2/2008 |

(Continued)

OTHER PUBLICATIONS

Stefan, Razvan, Eugen Culea, and Petru Pascuta. "The effect of copper ions addition on structural and optical properties of zinc borate glasses." Journal of non-crystalline solids 358.4 (2012): 839-846. (Year: 2012).*
"Zinc Borate" American Elements; https://www.americanelements.com/zinc-borate-10361-94-1; Accessed Feb. 20, 2025 (Year: 2025).*
International Search Report for PCT/US2016/045079, mailed Nov. 24, 2016, 1 page.
Espacenet bibliographic data for JP 2001-089187, published Apr. 3, 2001, 1 page.
Derwent abstract for JP 06-144868, published May 24, 1994, 2 pages.
Derwent abstract for JP 2009-120485, published Jun. 4, 2009, 1 page.
International Search Report for PCT/US2020/019832, published Sep. 3, 2020, 1 page.

*Primary Examiner* — Cameron K Miller
(74) *Attorney, Agent, or Firm* — Lee & Hayes, P.C.

(57) ABSTRACT

LTCC devices are produced from dielectric compositions Include a mixture of precursor materials that, upon firing, forms a dielectric material having a zinc-lithium-titanium oxide or silicon-strontium-copper oxide host.

18 Claims, No Drawings

(56) References Cited

U.S. PATENT DOCUMENTS

| | | | |
|---|---|---|---|
| 6,610,241 | B2 | 8/2003 | Shrout et al. |
| 6,631,070 | B2 | 10/2003 | Schmidt et al. |
| 6,723,673 | B2 | 4/2004 | Maher et al. |
| 6,858,554 | B2 | 2/2005 | Moon et al. |
| 7,161,795 | B1 | 1/2007 | Megherhi et al. |
| 7,230,817 | B2 | 6/2007 | Megherhi et al. |
| 7,521,390 | B2 | 4/2009 | Symes, Jr. et al. |
| 7,541,306 | B2 | 6/2009 | Koebrugge et al. |
| 7,550,319 | B2 | 6/2009 | Wang et al. |
| 7,858,548 | B2 | 12/2010 | Symes, Jr. et al. |
| 8,043,721 | B2 | 10/2011 | Khadilkar et al. |
| 8,101,536 | B2 | 1/2012 | Kim et al. |
| 8,114,801 | B2 | 2/2012 | Symes et al. |
| 8,305,731 | B2 | 11/2012 | Symes, Jr. et al. |
| 9,368,280 | B2 | 6/2016 | Park et al. |
| 9,613,756 | B2 | 4/2017 | Nishimura et al. |
| 9,704,650 | B2 | 7/2017 | Symes, Jr. |
| 9,852,848 | B2 | 12/2017 | Symes, Jr. |
| 9,892,853 | B2 | 2/2018 | Symes, Jr. et al. |
| 10,065,894 | B2 | 9/2018 | Symes, Jr. |
| 10,287,211 | B2 | 5/2019 | Symes, Jr. |
| 10,494,306 | B2 | 12/2019 | Symes, Jr. |
| 10,562,809 | B2 | 2/2020 | Gleason et al. |
| 2001/0015846 | A1 | 8/2001 | Morris et al. |
| 2004/0009864 | A1 | 1/2004 | Cho et al. |
| 2005/0276002 | A1* | 12/2005 | Sridharan ................. C03C 8/14 361/321.1 |
| 2006/0046922 | A1 | 3/2006 | Ito et al. |
| 2006/0058171 | A1 | 3/2006 | Izuki |
| 2006/0231803 | A1 | 10/2006 | Wang et al. |
| 2007/0018776 | A1 | 1/2007 | Tanaka et al. |
| 2007/0138459 | A1 | 6/2007 | Wong et al. |
| 2016/0240313 | A1 | 8/2016 | Symes, Jr. |
| 2017/0200557 | A1 | 7/2017 | Symes, Jr. |
| 2017/0240471 | A1 | 8/2017 | Symes, Jr. |
| 2018/0022650 | A1 | 1/2018 | Symes, Jr. |
| 2018/0170813 | A1 | 6/2018 | Symes, Jr. |

FOREIGN PATENT DOCUMENTS

| | | | |
|---|---|---|---|
| EP | 2300384 | B1 | 3/2011 |
| JP | 6-144868 | A | 5/1994 |
| JP | 2001-89187 | A | 4/2001 |
| JP | 2009-120485 | A | 6/2009 |
| RU | 2083515 | C1 | 7/1997 |
| WO | 2001/30714 | A1 | 5/2001 |
| WO | 2016/007255 | A1 | 1/2016 |
| WO | 2020/014035 | A1 | 1/2020 |
| WO | 2021/158756 | A1 | 8/2021 |

* cited by examiner

LTCC DIELECTRIC COMPOSITIONS AND DEVICES HAVING HIGH Q FACTORS

BACKGROUND OF THE INVENTION

1. Field of Invention

This invention relates to dielectric compositions, and more particularly to Zinc-Lithium-Titanium Oxide and Silicon-Strontium-Copper Oxide based dielectric compositions that exhibit a dielectric constant K=5-50, with very high Q factor at GHz frequencies and that can be used in low temperature co-fired ceramic (LTCC) applications with noble metal metallization.

2. Description of Related Art

The state of the art materials used in LTCC systems for wireless applications use dielectrics with a range of dielectric constants K=4-50 and with Q factors around 500-1,000 at the measuring frequency of 1 MHz. The particular application and device structure dictate the specific dielectric constant and Q factor that is needed. High dielectric constant, high Q factor materials are needed for demanding high frequency applications. This is generally achieved by combining high-K $CaTiO_3$ with a low-K material to obtain specific properties. However, the low Q factor of $CaTiO_3$ at GHz frequencies generally has the undesirable effect of lowering the Q factor of said ceramic. Additionally, the high firing temperature of $CaTiO_3$ is prohibitive for LTCC technologies.

SUMMARY OF THE INVENTION

This invention relates to dielectric compositions, and more particularly to zinc-lithium-titanium oxide and silicon-strontium-copper oxide based dielectric compositions that exhibit a dielectric constant K=5-50, for example about 5 to about 30 with very high Q factor at GHz high frequencies and that can be used in low temperature co-fired ceramic (LTCC) applications with noble metal metallization. The Q factor=1/Df, where Df is the dielectric loss tangent. The Qf value is a parameter used to describe the quality of a dielectric, typically at frequencies in the GHz range. Qf can be expressed as Qf=Q×f, where the measurement frequency f (in GHz) is multiplied by the Q factor at that frequency. There is growing demand for high dielectric constant materials with very high 0 values greater than 1000 at >5 GHz for high frequency applications.

Broadly, the ceramic material of the invention includes a host which is made by mixing the appropriate amounts of ZnO, $Li_2O$, and $TiO_2$, or $SiO_2$, SrO, and CuO, and milling these materials together in an aqueous medium to a particle size $D_{50}$ ranging from about 0.2 to about 5.0 microns. This slurry is dried and calcined at about 800 to 1200° C. for about 1 to 5 hours to form the host material including ZnO, $Li_2O$, and $TiO_2$ or $SiO_2$, SrO, and CuO. The resultant host material is then mechanically pulverized and mixed with fluxing agents and again milled in an aqueous medium to a particle size $D_{50}$ ranging from about 0.2 to about 5.0 microns. Alternately, the particle size $D_{50}$ ranges from about 0.5 to about 1.0 micron. The milled ceramic powder is dried and pulverized to produce a finely divided powder. The resultant powder can be pressed into cylindrical pellets and fired at temperatures of about 775 to about 925° C. In one example, the pellets may be fired at temperatures of about 800 to about 910° C. The firing is conducted for a time of about 1 to about 200 minutes.

An embodiment of the invention is a composition comprising a mixture of precursor materials that, upon firing, forms a zinc-lithium-titanium oxide host material that is lead-free and cadmium-free and can, by itself, or in combination with other oxides, form a dielectric material.

An embodiment of the invention is a composition comprising a mixture of precursor materials that, upon firing, forms a silicon-strontium-copper oxide host material that is lead-free and cadmium-free and can, by itself, or in combination with other oxides, form a dielectric material.

In a preferred embodiment, the host material includes no lead. In an alternate preferred embodiment, the host material includes no cadmium. In a more preferred embodiment, the host material includes no lead and no cadmium.

In a preferred embodiment, the host material comprises (i) 40-65 wt % $TiO_2$, (ii) 30-60 wt % ZnO, and (iii) 0.1-15 wt % $Li_2O$.

In another embodiment, the host material comprises (i) 40-65 wt % $TiO_2$, (ii) 30-60 wt % ZnO, (iii) 0.1-15 wt % $Li_2O$, (iv) 0-5 wt % $MnO_2$, and (v) 0-5 wt % NiO.

In another preferred embodiment, the host material comprises (i) 45-75 wt % $SiO_2$ (ii) 15-35 wt % SrO, and (iii) 10-30 wt % CuO.

An embodiment of the invention may include more than one host or a choice of hosts disclosed elsewhere herein.

A dielectric material of the invention may include 80-99.6 wt % of any of at least one host material disclosed herein together with any or all of the following fluxing agents and dopants in an amount not to exceed the indicated value in parentheses: $SiO_2$ (4 wt %); $CaCO_3$ (4 wt %); $B_2O_3$ (4 wt %); $Li_2CO_3$ (4 wt %); LiF (4 wt %); $BaCO_3$ (8 wt %); zinc borate (8 wt %); and CuO (3 wt %).

In another embodiment, the fluxing agents and dopants may include; 0.3-8 wt % zinc borate, 0.1-4 wt % $B_2O_3$, 0-4 wt % $SiO_2$, 0-4 wt % $BaCO_3$, 0-4 wt % $CaCO_3$, 0-4 wt % $Li_2CO_3$, 0-4 wt % LiF, 0-3 wt % CuO, or oxide equivalents of any of the foregoing.

In still another embodiment, the fluxing agents and dopants may include: 0.3-8 wt % zinc borate, 0.1-4 wt % $B_2O_3$, 0-4 wt % $SiO_2$, 0-4 wt % $BaCO_3$, 0-4 wt % $CaCO_3$, 0-4 wt % $Li_2CO_3$, 0.1-4 wt % LiF, 0.1-3 wt % CuO, or oxide equivalents of any of the foregoing.

In yet another embodiment, the fluxing agents and dopants may include; 0-8 wt % zinc borate, 0.1-4 wt % $B_2O_3$, 0-4 wt % $SiO_2$, 0-4 wt % $BaCO_3$, 0-4 wt % $CaCO_3$, 0-4 wt % $Li_2CO_3$, 0-4 wt % LiF, 0-3 wt % CuO, or oxide equivalents of any of the foregoing.

In still yet another embodiment, the fluxing agents and dopants may include: 0.1-8 wt % zinc borate, 0.1-4 wt % $B_2O_3$, 0-4 wt % $SiO_2$, 0-4 wt % $BaCO_3$, 0-4 wt % $CaCO_3$, 0-4 wt % $Li_2CO_3$, 0-4 wt % LiF, 0-3 wt % CuO, or oxide equivalents of any of the foregoing.

In yet another embodiment, the fluxing agents and dopants may include: 0-8 wt % zinc borate, 0.1-4 wt % $B_2O_3$, 0-4 wt % $SiO_2$, 0-4 wt % $BaCO_3$, 0-4 wt % $CaCO_3$, 0-4 wt % $Li_2CO_3$, 0-4 wt % LiF, 0.1-3 wt % CuO, or oxide equivalents of any of the foregoing.

The dielectric materials of the invention contain no lead in any form and no cadmium in any form.

An embodiment of the invention is a lead-free and cadmium-free composition comprising a mixture of precursors that, upon firing, forms a lead-free and cadmium-free dielectric material comprising: (a) 35-65 wt % $TiO_2$, (b) 25-55 wt % ZnO, (c) 0.1-15 wt % $Li_2O$, (d) 0.1-5 wt % $B_2O_3$, (e) 0-4 wt % $SiO_2$, (f) 0-6 wt % BaO, (g) 0-4 wt % CaO, (h) 0-4 wt % LiF, (i) 0-3 wt % CuO, no lead and no cadmium.

Another embodiment of the invention is a lead-free and cadmium-free composition comprising a mixture of precursors that, upon firing, forms a lead-free and cadmium-free dielectric material comprising: (a) 35-65 wt % $TiO_2$, (b) 25-55 wt % ZnO, (c) 0.1-15 wt % $Li_2O$, (d) 0.1-5 wt % $B_2O_3$, (e) 0-7 wt % $SiO_2$, (f) 0-6 wt % BaO, (g) 0-6 wt % CaO, (h) 0-5 wt % LiF, (i) 0-5 wt % CuO, no lead and no cadmium.

Still another embodiment of the invention is a lead-free and cadmium-free composition comprising a mixture of precursors that, upon firing, forms a lead-free and cadmium-free dielectric material comprising: (a) 45-75 wt % $SiO_2$. (b) 15-35 wt % SrO, (c) 10-30 wt % CuO, (d) 0.1-5 wt % $B_2O_3$, (e) 0-4 wt % CaO, (f) 0-4 wt % $Li_2O$, (g) 0-8 wt % ZnO, (g) 0-4 wt % LiF, no lead and no cadmium.

Still yet another embodiment of the invention is a lead-free and cadmium-free composition comprising a mixture of precursors that, upon firing, forms a lead-free and cadmium-free dielectric material comprising: (a) 45-75 wt % $SiO_2$. (b) 15-35 wt % SrO, (c) 10-30 wt % CuO, (d) 0.1-5 wt % $B_2O_3$, (e) 0-6 wt % CaO, (f) 0-3 wt % $Li_2O$, (g) 0-8 wt % ZnO, (g) 0-5 wt % LiF, no lead and no cadmium.

In other embodiment of the invention, a lead-free and cadmium-free composition comprises a mixture of precursors that, upon firing, forms a lead-free and cadmium-free dielectric material comprising: (a) 47-54 wt % $TiO_2$, (b) 33-51 wt % ZnO, (c) 0.5-10 wt % $Li_2O$, (d) 0.91-1.8 wt % $B_2O_3$, (e) 0.04-0.2 wt % $SiO_2$, (f) 0-0.6 wt % BaO, (g) 0-0.4 wt % CaO, (h) 0.1-4 wt % LiF, (i) 0.1-3 wt % CuO, no lead and no cadmium.

In yet other embodiment of the invention, a lead-free and cadmium-free composition comprises a mixture of precursors that, upon firing, forms a lead-free and cadmium-free dielectric material comprising: (a) 50-56 wt % $SiO_2$, (b) 22-24 wt % ZnO, (c) 17-19 wt % CuO, (d) 0.4-2.2 wt % $B_2O_3$, (e) 0-0.4 wt % CaO, (f) 0-6.5 wt % ZnO, (g) 0.1-3 wt % $Li_2O$, (h) 0-5 wt % LiF, no lead and no cadmium.

In still yet other embodiment of the invention, a lead-free and cadmium-free composition comprises a mixture of precursors that, upon firing, forms a lead-free and cadmium-free dielectric material comprising: (a) 20-31 wt % $TiO_2$, (b) 16-25 wt % ZnO, (c) 9-15 wt % SrO, (d) 22-34 wt % $SiO_2$, (e) 7.6-11.5 wt % CuO (f) 2.1-3.2 wt % $Li_2O$, (g) 1-1.1 wt % $B_2O_3$, (h) 0.1-0.3 wt % CaO, (i) 0.5-0.9 wt % LiF, no lead and no cadmium.

For any embodiment of the invention, a material range bounded by zero is considered to provide support for a similar range bounded by 0.01% or 0.1% at the lower end.

For each compositional range bounded by zero weight percent, the range is considered to also teach a range with a lower bound of 0.01 wt % or 0.1 wt %. A teaching such as 60-90 wt % Ag+Pd+Pt+Au means that any or all of the named components can be present in the composition in the stated range.

In another embodiment, the invention relates to a lead-free and cadmium-free dielectric composition, comprising, prior to firing, any host material disclosed elsewhere herein.

In another embodiment, the present invention relates to an electric or electronic component comprising, prior to firing, any dielectric paste disclosed herein, together with a conductive paste comprising: (a) 60-90 wt % Ag+Pd+Pt+Au, (b) 1-10 wt % of an additive selected from the group consisting of silicides, carbides, nitrides, and borides of transition metals, (c) 0.5-10 wt % of at least one glass frit, and (d) 10-40 wt % of an organic portion. The electric or electronic component may be high Q resonators, band pass filters, wireless packaging systems, and combinations thereof.

In another embodiment, the present invention relates to a method of forming an electronic component comprising: applying any dielectric paste disclosed herein to a substrate; and firing the substrate at a temperature sufficient to sinter the dielectric material.

In another embodiment, the present invention relates to a method of forming an electronic component comprising applying particles of any dielectric material disclosed herein to a substrate and firing the substrate at a temperature sufficient to sinter the dielectric material.

In another embodiment, a method of the invention includes forming an electronic component comprising:

(a1) applying any dielectric composition disclosed herein to a substrate or (a2) applying a tape comprising any dielectric composition disclosed herein to a substrate or (a3) compacting a plurality of particles of any dielectric composition disclosed herein to form a monolithic composite substrate; and (b) firing the substrate at a temperature sufficient to sinter the dielectric material.

It is to be understood that each numerical value herein (percentage, temperature, etc.) is presumed to be preceded by "about." In any embodiment herein the dielectric material may comprise different phases, for example crystalline and amorphous in any ratio, for example 1:99 to 99:1, (crystalline:amorphous) expressed in either mol % or wt %. Other ratios include 10:90, 20:80, 30:70, 40:60, 50:50, 60:40, 70:30, 80:20 and 90:10 as well as all values in between. In one embodiment the dielectric paste includes 10-30 wt % crystalline dielectric material and 70-90 wt % amorphous dielectric material.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

LTCC (Low Temperature Co-fired Ceramic), is a multilayer, glass ceramic substrate technology which is co-fired with low resistance metal conductors, such as Ag, Au, Pt or Pd, or combinations thereof, at relatively low firing temperatures (less than 1000° C.). Sometimes it is referred to as "Glass Ceramics" because its main composition may consist of glass and alumina or other ceramic fillers. Some LTCC formulations are recrystallizing glasses. Glasses herein may be provided in the form of frits which may be formed in situ or added to a composition. In some situations, base metals such as nickel and its alloys may be used, ideally in non-oxidizing atmospheres, such as oxygen partial pressures of $10^{-12}$ to $10^{-8}$ atmospheres. A "base metal" is any metal other than gold, silver, palladium, and platinum. Alloying metals may include Mn, Cr, Co, and Al.

A tape cast from a slurry of dielectric material is cut, and holes known as vias are formed to enable electrical connection between layers. The vias are filled with a conductive paste. Circuit patterns are then printed, along with co-fired resistors as needed. Multiple layers of printed substrates are stacked. Heat and pressure are applied to the stack to bond layers together. Low temperature (<1000° C.) firing is then undertaken. The fired stacks are sawn to final dimensions and post fire processing completed as needed.

Multilayer structures useful in automotive applications may have about 5 ceramic layers, for example 3-7 ceramic layers or 4-6 ceramic layers. In RF applications, a structure may have 10-25 ceramic layers. As a wiring substrate, 5-8 ceramic layers may be used.

Raw Dielectric Material

The ceramic material of the invention includes a host which is made by mixing the appropriate amounts of ZnO, $Li_2O$, and $TiO_2$, or $SiO_2$, SrO, and CuO, milling these materials together in an aqueous medium to a particle size $D_{50}$ ranging from about 0.2 to about 5.0 microns. This slurry is dried and calcined at about 800 to 1200° C. for about 1 to 5 hours to form the host material including ZnO, $Li_2O$, and $TiO_2$ or $SiO_2$, SrO, and CuO. The resultant host material is then mechanically pulverized and mixed with fluxing agents and again milled in an aqueous medium to a particle size $D_{50}$ ranging from about 0.2 to about 5.0 microns. In another embodiment, the particle size $D_{50}$ ranges from about 0.5 to about 1.0 micron.

The resultant host material is subject to the calcination, in part, to remove volatile impurities in the host material to potentially promote a solid state reaction in a subsequent process. The calcination at elevated temperature (at about 800 to 1200° C.) may result in an agglomeration between particles. The milled ceramic powder is dried and pulverized to produce a finely divided powder.

The host materials, after calcination and pulverization, may be mixed with fluxing agents. The resultant powder can be pressed into cylindrical pellets and fired at temperatures of about 775 to about 925° C. In one example, the pellets may be fired at temperatures of about 800 to about 910° C. The firing is conducted for a time of about 1 to about 200 minutes.

An embodiment of the invention is a composition comprising a mixture of precursor materials that, upon firing, forms a zinc-lithium-titanium oxide host material that is lead-free and cadmium-free and can, by itself, or in combination with other oxides, form a dielectric material.

An embodiment of the invention is a composition comprising a mixture of precursor materials that, upon firing, forms a silicon-strontium-copper oxide host material that is lead-free and cadmium-free and can, by itself, or in combination with other oxides, form a dielectric material.

In a preferred embodiment, the host material includes no lead. In an alternate preferred embodiment, the host material includes no cadmium. In a more preferred embodiment, the host material includes no lead and no cadmium.

In a preferred embodiment, the host material comprises (i) 40-65 wt % $TiO_2$, (ii) 30-60 wt % ZnO, and (iii) 0.1-15 wt % $Li_2O$.

In another embodiment, the host material comprises (i) 40-65 wt % $TiO_2$, (ii) 30-60 wt % ZnO, (iii) 0.1-15 wt % $Li_2O$, (iv) 0-5 wt % $MnO_2$, and (v) 0-5 wt % NiO.

In another preferred embodiment, the host material comprises (i) 45-75 wt % $SiO_2$. (ii) 15-35 wt % SrO, and (iii) 10-30 wt % CuO.

An embodiment of the invention may include more than one host or a choice of hosts disclosed elsewhere herein.

A dielectric material of the invention may include 80-99.6 wt % of any of at least one host material disclosed herein together with any or all of the following fluxing agents and dopants in an amount not to exceed the indicated value in parentheses: $SiO_2$ (4 wt %); $CaCO_3$ (4 wt %); $B_2O_3$ (4 wt %); $Li_2CO_3$ (4 wt %); LiF (4 wt %); $BaCO_3$ (8 wt %); zinc borate (8 wt %); and CuO (3 wt %).

In another embodiment, the fluxing agents and dopants may include; 0.3-8 wt % zinc borate, 0.1-4 wt % $B_2O_3$, 0-4 wt % $SiO_2$, 0-4 wt % $BaCO_3$, 0-4 wt % $CaCO_3$, 0-4 wt % $Li_2CO_3$, 0-4 wt % LiF, 0-3 wt % CuO, or oxide equivalents of any of the foregoing.

In still another embodiment, the fluxing agents and dopants may include: 0.3-8 wt % zinc borate, 0.1-4 wt % $B_2O_3$, 0-4 wt % $SiO_2$, 0-4 wt % $BaCO_3$, 0-4 wt % $CaCO_3$, 0-4 wt % $Li_2CO_3$, 0.1-4 wt % LiF, 0.1-3 wt % CuO, or oxide equivalents of any of the foregoing.

In still another embodiment, the fluxing agents and dopants may include: 0.3-8 wt % zinc borate, 0.1-4 wt % $B_2O_3$, 0-4 wt % $SiO_2$, 0-4 wt % $BaCO_3$, 0-4 wt % $CaCO_3$, 0-4 wt % $Li_2CO_3$, 0.2-3.5 wt % LiF, 0.2-2.5 wt % CuO, or oxide equivalents of any of the foregoing.

In yet another embodiment, the fluxing agents and dopants may include: 0-8 wt % zinc borate, 0.1-4 wt % $B_2O_3$, 0-4 wt % $SiO_2$, 0-4 wt % $BaCO_3$, 0-4 wt % $CaCO_3$, 0-4 wt % $Li_2CO_3$, 0-4 wt % LiF, 0-3 wt % CuO, or oxide equivalents of any of the foregoing.

In yet another embodiment, the fluxing agents and dopants may include: 0-8 wt % zinc borate, 0.1-4 wt % $B_2O_3$, 0-4 wt % $SiO_2$, 0-4 wt % $CaCO_3$, 0-4 wt % $Li_2CO_3$, 0-4 wt % LiF, 0-3 wt % CuO, or oxide equivalents of any of the foregoing.

In still yet another embodiment, the fluxing agents and dopants may include: 0.1-8 wt % zinc borate, 0.1-4 wt % $B_2O_3$, 0-4 wt % $SiO_2$, 0-4 wt % $BaCO_3$, 0-4 wt % $CaCO_3$, 0-4 wt % $Li_2CO_3$, 0-4 wt % LiF, 0-3 wt % CuO, or oxide equivalents of any of the foregoing.

In yet another embodiment, the fluxing agents and dopants may include: 0-8 wt % zinc borate, 0.1-4 wt % $B_2O_3$, 0-4 wt % $SiO_2$, 0-4 wt % $BaCO_3$, 0-4 wt % $CaCO_3$, 0-4 wt % $Li_2CO_3$, 0-4 wt % LiF, 0.1-3 wt % CuO, or oxide equivalents of any of the foregoing.

In yet another embodiment, the fluxing agents and dopants may include: 0-8 wt % zinc borate, 0.1-4 wt % $B_2O_3$, 0-4 wt % $SiO_2$, 0-4 wt % $CaCO_3$, 0-4 wt % $Li_2CO_3$, 0-4 wt % LiF, 0.1-3 wt % CuO, or oxide equivalents of any of the foregoing.

In still another embodiment, the fluxing agents and dopants may include: 0-8 wt % zinc borate, 0.1-4 wt % 8203, 0-4 wt % $SiO_2$, 0-4 wt % $BaCO_3$, 0-4 wt % $CaCO_3$, 0-4 wt % $Li_2CO_3$, 0-4 wt % LiF, 0.1-3 wt % CuO, or oxide equivalents of any of the foregoing.

In still yet another embodiment, the fluxing agents and dopants may include: 0-8 wt % zinc borate, 0.2-3.5 wt % $B_2O_3$, 0-4 wt % $SiO_2$, 0-4 wt % $CaCO_3$, 0-4 wt % $Li_2CO_3$, 0-4 wt % LiF, 0.2-2.5 wt % CuO, or oxide equivalents of any of the foregoing.

The dielectric composition of the invention contain no lead in any form and no cadmium in any form.

Another embodiment of the invention is a lead-free and cadmium-free composition comprising a mixture of precursors that, upon firing, forms a lead-free and cadmium-free dielectric material comprising: (a) 35-65 wt % $TiO_2$, (b) 25-55 wt % ZnO, (c) 0.1-15 wt % $Li_2O$, (d) 0.1-5 wt % $B_2O_3$, (e) 0-7 wt % $SiO_2$, (f) 0-6 wt % BaO, (g) 0-6 wt % CaO, (h) 0-5 wt % LiF, (i) 0-5 wt % CuO, no lead and no cadmium.

Still another embodiment of the invention is a lead-free and cadmium-free composition comprising a mixture of precursors that, upon firing, forms a lead-free and cadmium-free dielectric material comprising: (a) 45-75 wt % $SiO_2$. (b) 15-35 wt % SrO, (c) 10-30 wt % CuO, (d) 0.1-5 wt % $B_2O_3$, (e) 0-4 wt % CaO, (f) 0-4 wt % $Li_2O$, (g) 0-8 wt % ZnO, (g) 0-4 wt % LiF, no lead and no cadmium.

Still yet another embodiment of the invention is a lead-free and cadmium-free composition comprising a mixture of precursors that, upon firing, forms a lead-free and cadmium-free dielectric material comprising: (a) 45-75 wt % $SiO_2$. (b) 15-35 wt % SrO, (c) 10-30 wt % CuO, (d) 0.1-5 wt % $B_2O_3$, (e) 0-6 wt % CaO, (f) 0-3 wt % $Li_2O$, (g) 0-8 wt % ZnO, (g) 0-5 wt % LiF, no lead and no cadmium.

In another embodiment of the invention, a lead-free and cadmium-free composition comprises a mixture of precursors that, upon firing, forms a lead-free and cadmium-free dielectric material comprising: (a) 47-54 wt % $TiO_2$, (b) 33-51 wt % ZnO, (c) 0.5-10 wt % $Li_2O$, (d) 0.91-1.8 wt % $B_2O_3$, (e) 0.04-0.2 wt % $SiO_2$, (f) 0-0.6 wt % BaO, (g) 0-0.4 wt % CaO, (h) 0.1-4 wt % LiF, (i) 0.1-3 wt % CuO, no lead and no cadmium.

In still yet another embodiment of the invention, a lead-free and cadmium-free composition comprises a mixture of precursors that, upon firing, forms a lead-free and cadmium-free dielectric material comprising: (a) 47-54 wt % $TiO_2$, (b) 33-51 wt % ZnO, (c) 0.5-10 wt % $Li_2O$, (d) 0.1-3 wt % $B_2O_3$, (e) 0-0.3 wt % $SiO_2$. (f) 0-0.6 wt % BaO, (g) 0-0.4 wt % CaO, (h) 0.1-4 wt % LiF, (i) 0.1-3 wt % CuO, no lead and no cadmium.

In yet another embodiment of the invention, a lead-free and cadmium-free composition comprises a mixture of precursors that, upon firing, forms a lead-free and cadmium-free dielectric material comprising: (a) 50-56 wt % $SiO_2$, (b) 22-24 wt % ZnO, (c) 17-19 wt % CuO, (d) 0.4-2.2 wt % $B_2O_3$, (e) 0-0.4 wt % CaO, (f) 0-6.5 wt % ZnO, (g) 0.2-3 wt % $Li_2O$, (h) 0-5 wt % LiF, no lead and no cadmium.

In still yet other embodiment of the invention, a lead-free and cadmium-free composition comprises a mixture of precursors that, upon firing, forms a lead-free and cadmium-free dielectric material comprising: (a) 20-31 wt % $TiO_2$, (b) 16-25 wt % ZnO, (c) 9-15 wt % SrO, (d) 22-34 wt % $SiO_2$, (e) 6-12 wt % CuO, (f) 2-4 wt % $Li_2O$, (g) 0.7-2 wt % $B_2O_3$, (h) 0.1-0.5 wt % CaO, (i) 0.2-1 wt % LiF, no lead and no cadmium.

Dielectric Pastes. A paste for forming the dielectric layers can be obtained by mixing an organic vehicle with a raw dielectric material, as disclosed herein. Also useful are precursor compounds (carbonates, nitrates, sulfates, phosphates) that convert to such oxides and composite oxides upon firing, as stated hereinabove. The dielectric material is obtained by selecting compounds containing these oxides, or precursors of these oxides, and mixing them in the appropriate proportions. The proportion of such compounds in the raw dielectric material is determined such that after firing, the desired dielectric layer composition may be obtained. The raw dielectric material (as disclosed elsewhere herein) is generally used in powder form having a mean particle size of about 0.1 to about 3 microns, and more preferably about 1 micron or less.

Organic Vehicle. The pastes herein include an organics portion. The organics portion is or includes an organic vehicle, which is a binder in an organic solvent or a binder in water. The choice of binder used herein is not critical; conventional binders such as ethyl cellulose, polyvinyl butanol, ethyl cellulose, and hydroxypropyl cellulose, and combinations thereof are appropriate together with a solvent. The organic solvent is also not critical and may be selected in accordance with a particular application method (i.e., printing or sheeting), from conventional organic solvents such as butyl carbitol, acetone, toluene, ethanol, diethylene glycol butyl ether; 2,2,4-trimethyl pentanediol monoisobutyrate (Texanol®); alpha-terpineol; beta-terpineol; gamma terpineol; tridecyl alcohol; diethylene glycol ethyl ether (Carbitol®), diethylene glycol butyl ether (Butyl Carbitol®) and propylene glycol; and blends thereof, Products sold under the Texanol® trademark are available from Eastman Chemical Company, Kingsport, TN; those sold under the Dowano® and Carbitol® trademarks are available from Dow Chemical Co., Midland, Mi.

No particular limit is imposed on the organics portion of the dielectric pastes of the invention. In one embodiment the dielectric pastes of the invention include from about 10 wt % to about 40 wt % of the organic vehicle; in another, from about 10 wt % to about 30 wt %. Often the paste contains about 1 to 5 wt % of the binder and about 10 to 50 wt % of the organic solvent, with the balance being the dielectric component (that Is, the dielectric material as a solids portion). In one embodiment, the dielectric paste of the invention includes from about 60 to about 90 wt % of solids portion elsewhere disclosed, and from about 10 wt % to about 40 wt % of the organics portion described in this and the preceding paragraph. If desired, the pastes of the invention may contain up to about 10 wt % of other additives such as dispersants, plasticizers, dielectric compounds, and insulating compounds.

Filler. In order to minimize expansion mismatch between tape layers of differing dielectric compositions, fillers such as cordierite, alumina, zircon, fused silica, aluminosilicates and combinations thereof may be added to one or more dielectric pastes herein in an amount of 1-30 wt %, preferably 2-20 wt % and more preferably 2-15 wt %.

Firing. The dielectric stack (two or more layers) is then fired in an atmosphere, which is determined according to the type of conductor in the internal electrode layer-forming paste. Where the internal electrode layers are formed of a base metal conductor such as nickel and nickel alloys, the firing atmosphere may have an oxygen partial pressure of about $10^{-12}$ to about $10^{-8}$ atm. Firing at a partial pressure lower than about $10^{-12}$ atm should be avoided, since at such low pressures the conductor can be abnormally fired and may become disconnected from the dielectric layers. At oxygen partial pressures above about $10^{-8}$ atm, the internal electrode layers may be oxidized. Oxygen partial pressures of about $10^{-11}$ to about $10^{-9}$ atm are most preferred. It is also possible to fire the dielectric compositions disclosed herein in ambient air. However, reducing atmospheres ($H_2$, $N_2$ or $H_2/N_2$) can undesirably reduce $Bi_2O_3$ from a dielectric paste to metallic bismuth.

Applications for the LTCC compositions and devices disclosed herein include band pass filters, (high pass or low pass), wireless transmitters and receivers for telecommunications including cellular applications, power amplifier modules (PAM), RF front end modules (FEM), WiMAX2 modules, LTE-advanced modules, transmission control units (TCU), electronic power steering (EPS), engine management systems (EMS), various sensor modules, radar modules, pressure sensors, camera modules, small outline tuner modules, thin profile modules for devices and components, and IC tester boards. Band-pass filters contain two major parts, one a capacitor and the other an inductor. Low K material is good for designing the inductor, but not suitable for designing a capacitor due the requirement for more active area to generate sufficient capacitance. High K material will result in the opposite. The inventors have discovered that Low K (4-8)/Mid K (10-100) LTCC material can be co-fired and put into a single component; low K materials can be used to design inductor area and high K material can be used to design capacitor area to have optimized performance.

EXAMPLES

The following examples are provided to illustrate preferred aspects of the invention and are not intended to limit the scope of the invention.

Appropriate amounts of ZnO, $Li_2CO_3$, and $TiO_2$, or $SiO_2$, $SrCO_3$, and CuO are mixed and then milled together in an aqueous medium to a particle size $D_{50}$ ranging from about 0.2 to 5.0 micron. This slurry is dried and calcined at about 800 to 1250° C. for about 1 to 10 hours to form the host material. After calcination, the resultant host material is then mechanically pulverized and mixed with fluxing agents and dopants according to the formulations described herein and again milled in an aqueous medium to a particle size $D_{50}$ ranging from about 0.2 to about 5.0 microns. Alternately, the particle size $D_{50}$ ranges from about 0.5 to about 1.0 micron. The milled particles are dried and pulverized to produce a finely divided powder. This resultant powder is then pressed into cylindrical pellets and fired at a temperature of about 800-910° C. For example, the pellets may be fired at a temperature of about 850-900° C. for about 15-60 minutes. The as-fired (sintered) pellets have the compositions listed in Table 1.

TABLE 1

Compositions in weight % of the fired pellets.

| | Formulation | | | | | | | | | |
|---|---|---|---|---|---|---|---|---|---|---|
| | 1 | 2 | 3 | 4 | 5 | 6 | 7 | 8 | 9 | 10 |
| $TiO_2$ | 47.266 | 50.895 | 53.437 | 48.475 | 0.000 | 0.000 | 0.000 | 20.358 | 25.447 | 30.537 |
| ZnO | 50.351 | 41.109 | 40.840 | 43.490 | 0.000 | 6.051 | 3.229 | 16.444 | 20.555 | 24.665 |
| SrO | 0.000 | 0.000 | 0.000 | 0.000 | 23.910 | 22.029 | 23.077 | 14.346 | 11.955 | 9.564 |
| $SiO_2$ | 0.000 | 0.000 | 0.123 | 0.052 | 55.584 | 51.098 | 53.529 | 33.351 | 27.792 | 22.234 |
| CuO | 0.654 | 0.552 | 0.246 | 0.509 | 18.576 | 17.476 | 18.362 | 11.407 | 9.614 | 7.822 |
| $Li_2O$ | 0.567 | 4.760 | 4.024 | 5.146 | 0.621 | 0.000 | 0.000 | 2.276 | 2.690 | 3.104 |
| $B_2O_3$ | 1.203 | 1.190 | 0.943 | 1.779 | 0.929 | 2.113 | 0.417 | 1.033 | 1.060 | 1.086 |
| BaO | 0.000 | 0.000 | 0.000 | 0.549 | 0.000 | 0.000 | 0.000 | 0.000 | 0.000 | 0.000 |
| CaO | 0.000 | 0.000 | 0.386 | 0.000 | 0.380 | 0.000 | 0.000 | 0.228 | 0.190 | 0.152 |
| LiF | 0.000 | 1.394 | 0.000 | 0.000 | 0.000 | 1.233 | 1.386 | 0.557 | 0.697 | 0.836 |

The following table presents properties and performance data of the formulations set forth in Table 1.

TABLE 2

K, Q & Qf data for formulations 1-10 after firing.

| | Formulation | | | | | | | | | |
|---|---|---|---|---|---|---|---|---|---|---|
| | 1 | 2 | 3 | 4 | 5 | 6 | 7 | 8 | 9 | 10 |
| Frequency (GHz) | 10.19 | 9.07 | 10.48 | 10.23 | 15.52 | 15.62 | 15.41 | 13.13 | 12.63 | 12.22 |
| K | 23.28 | 18.04 | 18.80 | 18.54 | 5.29 | 5.15 | 5.44 | 9.09 | 10.31 | 12.13 |
| Q Factor | 2,035 | 2,706 | 2,146 | 1,983 | 1,078 | 940 | 1,169 | 897 | 952 | 873 |
| Qf | 20,730 | 24,541 | 22,483 | 20,286 | 16,724 | 14,686 | 18,012 | 11,778 | 12,026 | 10,067 |

Dielectric constant (K) of the formulations 1-10 after firing were found to range about from 5.15 to about 23.28. Dielectric constant (K) and Q factor are measured using the resonant cavity technique. Q factor measured for formulations 1-10 after firing ranges from about 873 to about 2706 when measured at about 9 GHz or above.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

The invention is further defined by the following items.

Item 1. A lead-free and cadmium-free composition comprising (a) 80-99.6 wt % of a calcined host material comprising:

i) 40-65 wt % $TiO_2$, ii) 30-60 wt % ZnO, iii) 0.1-15 wt % $Li_2O$, iv) 0-5 wt % $MnO_2$, v) 0-5 wt % NiO, vi) no lead, and vii) no cadmium, together with (b) 0.3-8 wt % zinc borate.

(c) 0.1-4 wt % $B_2O_3$, (d) 0-4 wt % $SiO_2$, (e) 0-4 wt % $BaCO_3$, (f) 0-4 wt % $CaCO_3$, (g) 0-4 wt % $Li_2CO_3$, (h) 0-4 wt % LiF and (i) 0-3 wt % CuO, or oxide equivalents of any of the foregoing, no lead and no cadmium.

Item 2. The lead-free and cadmium-free composition of item 1, wherein LiF is included at 0.1-4 wt %, and CuO is included at 0.1-3 wt %.

Item 3. The lead-free and cadmium-free composition of item 1, wherein LiF is included at 0.2-3.5 wt %, and CuO is included at 0.2-2.5 wt %.

Item 4. A lead-free and cadmium-free composition comprising:

(a) 80-99.9 wt % of a calcined host material comprising:

i) 45-75 wt % $SiO_2$, ii) 15-35 wt % SrO, iii) 10-30 wt % CuO, iv) no lead, and
v) no cadmium, together with (b) 0-8 wt % zinc borate,
(c) 0.1-4 wt % $B_2O_3$,
(d) 0-4 wt % $SiO_2$,
(e) 0-4 wt % $CaCO_3$,
(f) 0-4 wt % $Li_2CO_3$,
(g) 0-4 wt % LiF and
(h) 0-3 wt % CuO, or oxide equivalents of any of the foregoing, no lead and no cadmium.

Item 5. The lead-free and cadmium-free composition of item 4, wherein CuO is included at 0.1-3 wt %.

Item 6. The lead-free and cadmium-free composition of item 4, wherein $B_2O_3$ is included at 0.2-3.5 wt % $B_2O_3$, and CuO is included at 0.2-2.5 wt %.

Item 7. A lead-free and cadmium-free composition comprising:

(a) 80-99.8 wt % of any combination of host materials of any of items 1 and 4, together with
(b) 0.1-8 wt % zinc borate,
(c) 0.1-4 wt % $B_2O_3$,
(d) 0-4 wt % $SiO_2$,
(e) 0-4 wt % $CaCO_3$,
(f) 0-4 wt % $BaCO_3$,
(g) 0-4 wt % $Li_2CO_3$,
(h) 0-4 wt % LiF, and
(i) 0-3 wt % CuO, or oxide equivalents of any of the foregoing, no lead and no cadmium.

Item 8. A lead-free and cadmium-free composition comprising a mixture of precursors that, upon firing, forms a lead-free and cadmium-free dielectric material comprising:

(a) 35-65 wt % $TiO_2$,
(b) 25-55 wt % ZnO,
(c) 0.1-15 wt % $Li_2O$,
(d) 0.1-5 wt % $B_2O_3$,
(e) 0-7 wt % $SiO_2$,
(f) 0-6 wt % BaO,
(g) 0-6 wt % CaO,
(h) 0-5 wt % LiF, and
(i) 0-5 wt % CuO, no lead and no cadmium.

Item 9. The lead-free and cadmium-free composition of item 8, wherein:

$TiO_2$ is included at 47-54 wt %,
ZnO is included at 33-51 wt %,
$Li_2O$ is included at 0.5-10 wt %,
$B_2O_3$ is included at 0.1-3 wt %,
$SiO_2$ is included at 0-0.3 wt %,
BaO is included at 0-0.6 wt %,
CaO is included at 0-0.4 wt %,
LiF is included at 0.1-4 wt %, and
CuO is included at 0.1-3 wt %.

Item 10. A lead-free and cadmium-free composition comprising a mixture of precursors that, upon firing, forms a lead-free and cadmium-free dielectric material comprising:

(a) 45-75 wt % $SiO_2$,
(b) 15-35 wt % SrO,
(c) 10-30 wt % CuO,
(d) 0.1-5 wt % $B_2O_3$,
(e) 0-6 wt % CaO,
(f) 0-8 wt % ZnO,
(g) 0-3 wt % $Li_2O$, and
(h) 0-5 wt % LiF, no lead and no cadmium.

Item 11. The lead-free and cadmium-free composition of item 10, wherein:

$SiO_2$ is included at 50-56 wt %,
SrO is included at 22-24 wt %,
CuO is included at 17-19 wt %,
$B_2O_3$ is included at 0.4-2.2 wt %,
CaO is included at 0-0.4 wt %,
ZnO is included at 0-6.5 wt %,
$Li_2O$ is included at 0.2-3 wt %, and
LiF is included at 0-5 wt %.

Item 12. A lead-free and cadmium-free composition comprising a mixture of precursors that, upon firing, forms a lead-free and cadmium-free dielectric material comprising:

(a) 20-31 wt % $TiO_2$,
(b) 16-25 wt % ZnO,
(c) 9-15 wt % SrO,
(d) 22-34 wt % $SiO_2$,
(e) 6-12 wt % CuO,
(f) 2-4 wt % $Li_2O$,
(g) 0.7-2 wt % $B_2O_3$,
(h) 0.1-0.5 wt % CaO, and
(i) 0.2-1 wt % LiF, no lead and no cadmium.

Item 13. A lead-free and cadmium-free composition comprising a mixture of precursors that, upon firing, forms a lead-free and cadmium-free dielectric material comprising any combination of items 8-12.

Item 14. The lead-free and cadmium-free composition of any of items 1-11, wherein, after firing, the dielectric material exhibits a Q value of at least 800 when measured at greater than 5 GHz.

Item 15. The lead-free and cadmium-free composition of any of items 1-13, wherein, after firing, the dielectric material exhibits a dielectric constant K of 5-50.

Item 16. The lead-free and cadmium-free composition of any of items 1, 4 and 7, wherein the calcined host material has particle size $D_{50}$ ranges from 0.2 to 5.0 microns.

Item 17. An electric or electronic component comprising, prior to firing, the lead-free and cadmium-free composition of any of items 1-16, together with a conductive paste comprising:

a. 60-90 wt % Ag+Pd+Pt+Au,
b. 1-10 wt % of an additive selected from the group consisting of silicides, carbides, nitrides, and borides of transition metals,
c. 0.5-10 wt % of at least one glass frit, and
d. 10-40 wt % of an organic portion.

Item 18. The electric or electronic component of item 17, wherein the electric or electronic component is selected from the group consisting of high Q resonators, electromagnetic interference filter, band pass filters, wireless packaging systems, and combinations thereof Item 19. A method of forming an electronic component comprising:

(a1) applying the composition of any of items 1-13 to a substrate, or
(a2) applying a tape comprising the composition of any of items 1-13 to a substrate, or
(a3) compacting a plurality of particles of the composition of any of items 1-13 to form a monolithic composite substrate; and
(b) firing the substrate at a temperature sufficient to sinter the composition.

Item 20. The method of item 19, wherein the firing is conducted at a temperature of from about 800° C. to about 910° C.

What is claimed is:

1. A lead-free and cadmium-free raw dielectric composition comprising:

(a) 80-99.9 wt % of a calcined host material comprising:

i) 45-75 wt % $SiO_2$, ii) 15-35 wt % SrO, iii) 10-30 wt % CuO, iv) no lead, and v) no cadmium, mixed together with (b) 0-8 wt % zinc borate, (c) 0.1-4 wt % $B_2O_3$, (d) 0-4 wt % $SiO_2$, (e) 0-4 wt % $CaCO_3$, (f) 0-4 wt % $Li_2CO_3$, (g) 0-4 wt % LiF and (h) 0-3 wt % CuO; and no lead and no cadmium.

2. The lead-free and cadmium-free raw dielectric composition of claim 1, wherein the host material is provided in the composition together with 0.1-3 wt % CuO.

3. The lead-free and cadmium-free raw dielectric composition of claim 1, wherein the host material is provided in the composition together with 0.2-3.5 wt % $B_2O_3$ and 0.2-2.5 wt % CuO.

4. The lead-free and cadmium-free raw dielectric composition of claim 1, wherein the host material is included at 80-99.8 wt % and the host material is provided in the composition together with 0.1-8 wt % zinc borate.

5. A lead-free and cadmium-free composition comprising a mixture that, upon firing, forms a lead-free and cadmium-free dielectric material comprising:

(a) 45-75 wt % $SiO_2$, (b) 15-35 wt % SrO, (c) 10-30 wt % CuO, (d) 0.1-5 wt % $B_2O_3$, (e) 0-6 wt % CaO, (f) 0-8 wt % ZnO, (g) 0-3 wt % $Li_2O$, (h) 0-5 wt % LiF, and wherein the molar ratio of $B_2O_3$ to $SiO_2$ is from 0.0012 to 0.096.

6. The lead-free and cadmium-free composition of claim 5, wherein:

$SiO_2$ is included at 50-56 wt %,

SrO is included at 22-24 wt %,

CuO is included at 17-19 wt %, $B_2O_3$ is included at 0.4-2.2 wt %,

CaO is included at 0-0.4 wt %,

ZnO is included at 0-6.5 wt %, $Li_2O$ is included at 0.2-3 wt %, and

LiF is included at 0-5 wt %.

7. The lead-free and cadmium-free raw dielectric composition of claim 1, wherein, after firing, the dielectric composition exhibits a Q value of at least 800 when measured at greater than 5 GHz.

8. The lead-free and cadmium-free composition of claim 5, wherein, after firing, the dielectric material exhibits a Q value of at least 800 when measured at greater than 5 GHz.

9. The lead-free and cadmium-free raw dielectric composition of claim 1, wherein, after firing, the dielectric composition exhibits a dielectric constant K of 5-50.

10. The lead-free and cadmium-free composition of claim 5, wherein, after firing, the dielectric material exhibits a dielectric constant K of 5-50.

11. The lead-free and cadmium-free raw dielectric composition of claim 1, wherein the calcined host material has a particle size $D_{50}$ ranging from 0.2 to 5.0 microns.

12. The lead-free and cadmium-free composition of claim 5, wherein the mixture has a particle size $D_{50}$ ranging from 0.2 to 5.0 microns.

13. An unfired electric or electronic component comprising, prior to firing, the lead-free and cadmium-free raw dielectric composition of claim 1, together with a conductive paste comprising:

a. 60-90 wt % Ag+Pd+Pt+Au, b. 1-10 wt % of an additive selected from the group consisting of silicides, carbides, nitrides, and borides of transition metals, c. 0.5-10 wt % of at least one glass frit, d. 10-40 wt % of an organic portion.

14. The unfired electric or electronic component of claim 13, wherein the electric or electronic component is selected from the group consisting of high Q resonators, electromagnetic interference filter, band pass filters, wireless packaging systems, and combinations thereof.

15. An unfired electric or electronic component comprising, prior to firing, the lead-free and cadmium-free composition of claim 5, together with a conductive paste comprising:

e. 60-90 wt % Ag+Pd+Pt+Au, f. 1-10 wt % of an additive selected from the group consisting of silicides, carbides, nitrides, and borides of transition metals, g. 0.5-10 wt % of at least one glass frit, h. 10-40 wt % of an organic portion.

16. The unfired electric or electronic component of claim 15, wherein the electric or electronic component is selected from the group consisting of high Q resonators, electromagnetic interference filter, band pass filters, wireless packaging systems, and combinations thereof.

17. A method of forming an electronic component comprising:

(a1) applying the composition of claim 1 to a substrate, or (a2) applying a tape comprising the composition of claim 1 to a substrate, or (a3) compacting a plurality of particles of the composition of claim 1 to form a monolithic composite substrate; and (b) firing the substrate at a temperature sufficient to sinter the composition.

18. The method of claim 17, wherein the firing is conducted at a temperature of from about 800° C. to about 910° C.

* * * * *